(12) United States Patent
Zhou et al.

(10) Patent No.: US 7,967,273 B2
(45) Date of Patent: Jun. 28, 2011

(54) SUPPORT STAND

(75) Inventors: Fan Zhou, Shenzhen (CN); Guo-Qi Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 114 days.

(21) Appl. No.: 12/420,198

(22) Filed: Apr. 8, 2009

(65) Prior Publication Data

US 2010/0084522 A1    Apr. 8, 2010

(30) Foreign Application Priority Data

Oct. 8, 2008    (CN) .......................... 2008 1 0304772

(51) Int. Cl.
*A47G 29/00* (2006.01)
(52) U.S. Cl. .................. 248/372.1; 248/176.3; 248/921; 248/923; 361/679.22
(58) Field of Classification Search .............. 16/241, 16/376, 386; 248/133, 125.1, 917, 919–923, 248/371, 372.1, 176.1, 176.3; 361/679.06, 361/679.21, 679.22
See application file for complete search history.

(56) References Cited

U.S. PATENT DOCUMENTS

| | | | | |
|---|---|---|---|---|
| 5,812,368 A * | 9/1998 | Chen et al. | ............... | 361/679.06 |
| 6,347,433 B1 * | 2/2002 | Novin et al. | ................. | 16/367 |
| 6,532,628 B2 * | 3/2003 | Kim | .............. | 16/342 |
| 6,666,422 B1 * | 12/2003 | Lu et al. | ................ | 248/291.1 |
| 6,929,224 B1 * | 8/2005 | Masuda et al. | ............ | 248/176.3 |
| 7,338,019 B2 * | 3/2008 | Liu et al. | ................. | 248/123.11 |
| 7,494,104 B2 * | 2/2009 | Baek | .................. | 248/372.1 |
| 7,516,925 B2 * | 4/2009 | Sawai et al. | ................. | 248/146 |
| 7,567,436 B2 * | 7/2009 | Jeong | .................. | 361/679.22 |
| 7,578,490 B2 * | 8/2009 | Kim | .................. | 248/281.11 |
| 7,593,218 B2 * | 9/2009 | Hwang et al. | ........... | 361/679.21 |
| 7,604,210 B2 * | 10/2009 | Oddsen et al. | ........... | 248/280.11 |
| 7,694,919 B2 * | 4/2010 | Lee | ................. | 248/123.11 |
| 7,694,929 B2 * | 4/2010 | Jang | .................. | 248/372.1 |
| 7,770,856 B2 * | 8/2010 | Depay | ................. | 248/284.1 |
| 2003/0223188 A1 * | 12/2003 | Ha et al. | ................. | 361/681 |
| 2004/0021051 A1 * | 2/2004 | Chiu | .................. | 248/371 |
| 2004/0217244 A1 * | 11/2004 | Wu et al. | ................ | 248/278.1 |
| 2008/0301906 A1 * | 12/2008 | Chiang et al. | ............ | 16/241 |
| 2009/0158554 A1 * | 6/2009 | Chang et al. | ............ | 16/241 |

FOREIGN PATENT DOCUMENTS

CN             2629173 Y      7/2004

* cited by examiner

*Primary Examiner* — Terrell McKinnon
*Assistant Examiner* — Bradley H Duckworth
(74) *Attorney, Agent, or Firm* — Clifford O. Chi (57) ABSTRACT

The support stand includes a base, a rotatable bracket, a first hinge assembly and a second hinge assembly. Both the first hinge assembly and the second hinge assembly connect the rotatable bracket with the base. The first hinge assembly has a first pivotal shaft. The second hinge assembly has a second pivotal shaft. The first pivotal shaft is non-rotatably engaged with the second pivotal shaft, and aligned in a substantially straight line.

19 Claims, 6 Drawing Sheets

SUPPORT STAND

CROSS-REFERENCE STATEMENT

This application is related to two co-pending U.S. patent applications, application Ser. No. 12/344,675 filed on Dec. 29, 2008, entitled "ROTATABLE MODULE AND SUPPORTING MECHANISM USING THE SAME," application Ser. No. 12/422,358, and entitled "SUPPORT STAND FOR FLAT-PANEL DISPLAY MONITOR AND ELEVATING SUPPORT USED FOR SUPPORT STAND." The co-pending applications have the same assignee as the present application.

BACKGROUND

1. Technical Field

The present disclosure generally relates to support stands, particularly, to a support stand for a flat-panel display monitor.

2. Description of Related Art

Flat-panel display monitors, such as liquid crystal display monitors, offer advantages such as reduced size, smaller weight, and better image quality. A viewing angle and height of the flat-panel display monitor can be generally adjusted via a support stand.

A typical support stand includes a base, a rotatable bracket, a first connecting member, a second connecting member, a first hinge assembly, a second hinge assembly, two connecting assemblies, and an elastic member. The first connecting member is connected to a side of the rotatable bracket via the first hinge assembly. The second connecting member is connected to the other side of the rotatable bracket via the second hinge assembly. The rotatable bracket is connected to the first connecting member and second connecting member via the connecting assemblies. The elastic member connects the rotatable bracket with the base. A flat-panel display monitor is fixed on the rotatable bracket. The flat-panel display monitor is capable of rotating relative to the first hinge assembly or the second hinge assembly.

However, the first connecting member and the second connecting member are connected to the rotatable bracket. The axis of the first hinge assembly and the axis of the second hinge assembly may not align in a straight line when the flat-panel display monitor moves, because a weight of the flat-panel display monitor is applied on the support stand. As a result, the flat-panel display monitor may be tilted to one side of the support stand making it inconvenient for a user to watch.

Therefore, a support stand which overcomes the above-described shortcomings is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION OF THE EMBODIMENTS

Figure 1:
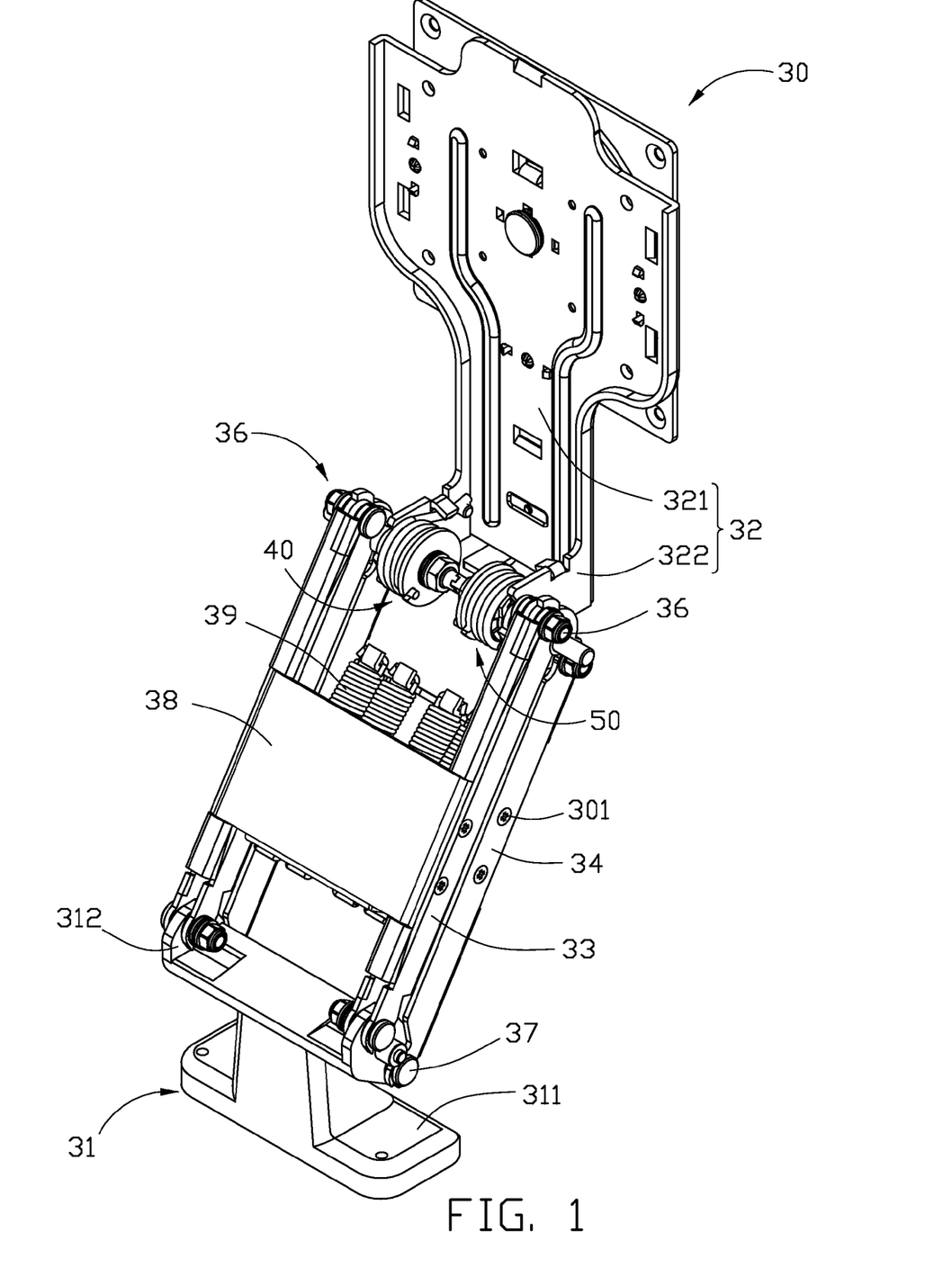
FIG. 1 is an assembled, isometric view of an embodiment of a support stand for a flat-panel display monitor.

Referring to FIG. 1, a support stand 30 for a flat-panel display monitor includes a base 31, a rotatable bracket 32, two first connecting members 33, two second connecting members 34, a first hinge assembly 40, a second hinge assembly 50, four connecting assemblies 36, four link assemblies 37, two connecting plates 38, four elastic members 39, and a plurality of fixing members 301. The rotatable bracket 32 is configured to hold a display screen of the flat-panel display monitor.

The base 31 includes a substantially I-shaped holder 311, and two supporting blocks 312 extending substantially perpendicularly from opposite ends of a top portion of the holder 311.

Figure 2:
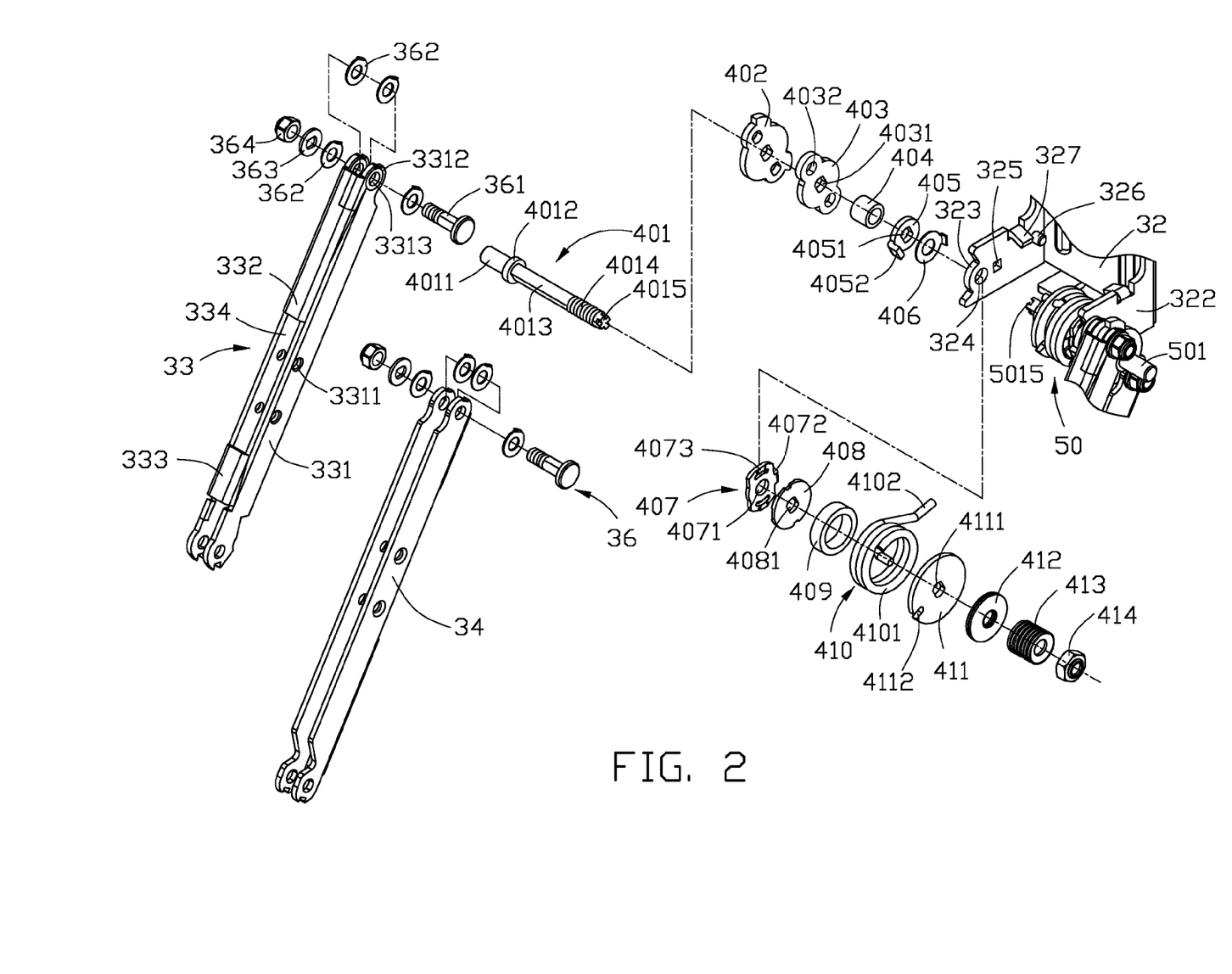
FIG. 2 is part of an exploded, isometric view of the support stand in FIG. 1.

The rotatable bracket 32 includes a mounting board 321, and two side walls 322 extending from opposite sides of the mounting board 321. Referring to FIG. 2, each of the side walls 322 defines a pivot hole 324, a positioning hole 325 adjacent to the pivot hole 324, and a restricting groove 323 in an end away from the mounting board 321. A positioning pole 326 and a limiting tab 327 are formed on each side wall 322 adjacent to the mounting board 321.

The first connecting member 33 includes two side plates 331, a first base plate 332, and a second base plate 333. The first base plate 332 and the second base plate 333 are each connected to the side plates 331, thereby defining a positioning groove 334. Each side plate 331 defines two threaded holes 3311 in a middle portion of each side plate 331. Two pivot pieces 3312 extend from opposite sides of each side plate 331. Each pivot piece 3312 defines a connecting hole 3313. The second connecting member 34 has a same structure as the first connecting member 33.

The first hinge assembly 40 includes a first pivotal shaft 401, a restricting member 402, a connecting piece 403, a sleeve 404, a limiting washer 405, a frictional washer 406, a stationary washer 407, a rotating washer 408, a ring 409, a torsion spring 410, a resisting piece 411, a plurality of washers 412, a plurality of spring washers 413, and a fastening member 414.

Figure 3:
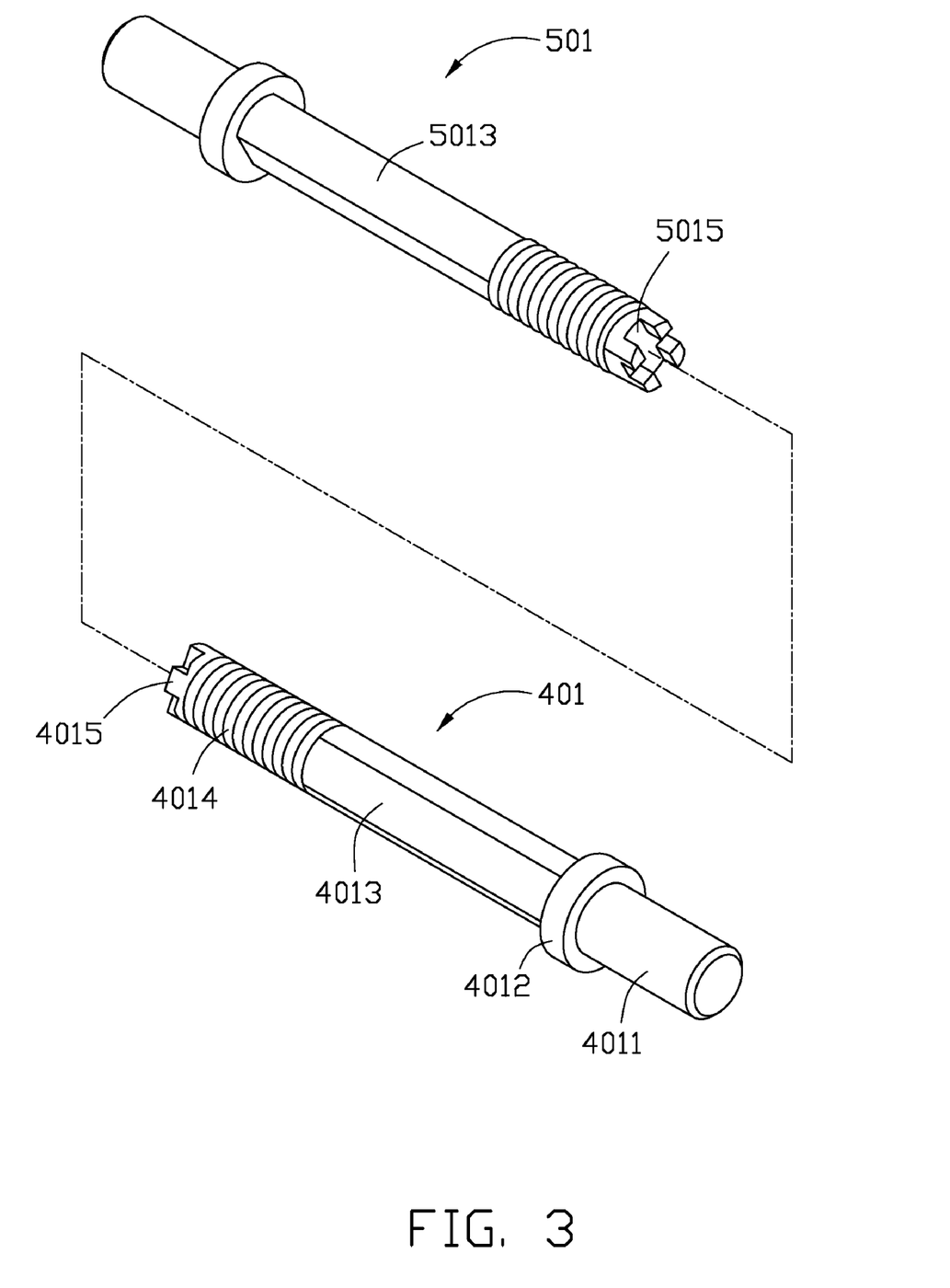
FIG. 3 is an isometric view of a first pivotal shaft and a second pivotal shaft in FIG. 2.

Referring to FIG. 3, the first pivotal shaft 401 includes a restricting flange 4012, a column portion 4011, and a shaft portion 4013. The column portion 4011 and the shaft portion 4013 extend from opposite sides of the restricting flange 4012. A cross-section of the shaft portion 4013 may be non-circular. In the illustrated embodiment, opposite sides of the shaft portion 4013 are flattened, thereby forming a deformed shaft portion. A threaded portion 4014 is formed on a distal end of the shaft portion 4013 opposite to the restricting flange 4012. An engaging protrusion 4015 extends from a distal end of the threaded portion 4014 away from the shaft portion 4013. In the illustrated embodiment, a cross-section of the engaging protrusion 4015 is cross-shaped.

Figure 4:
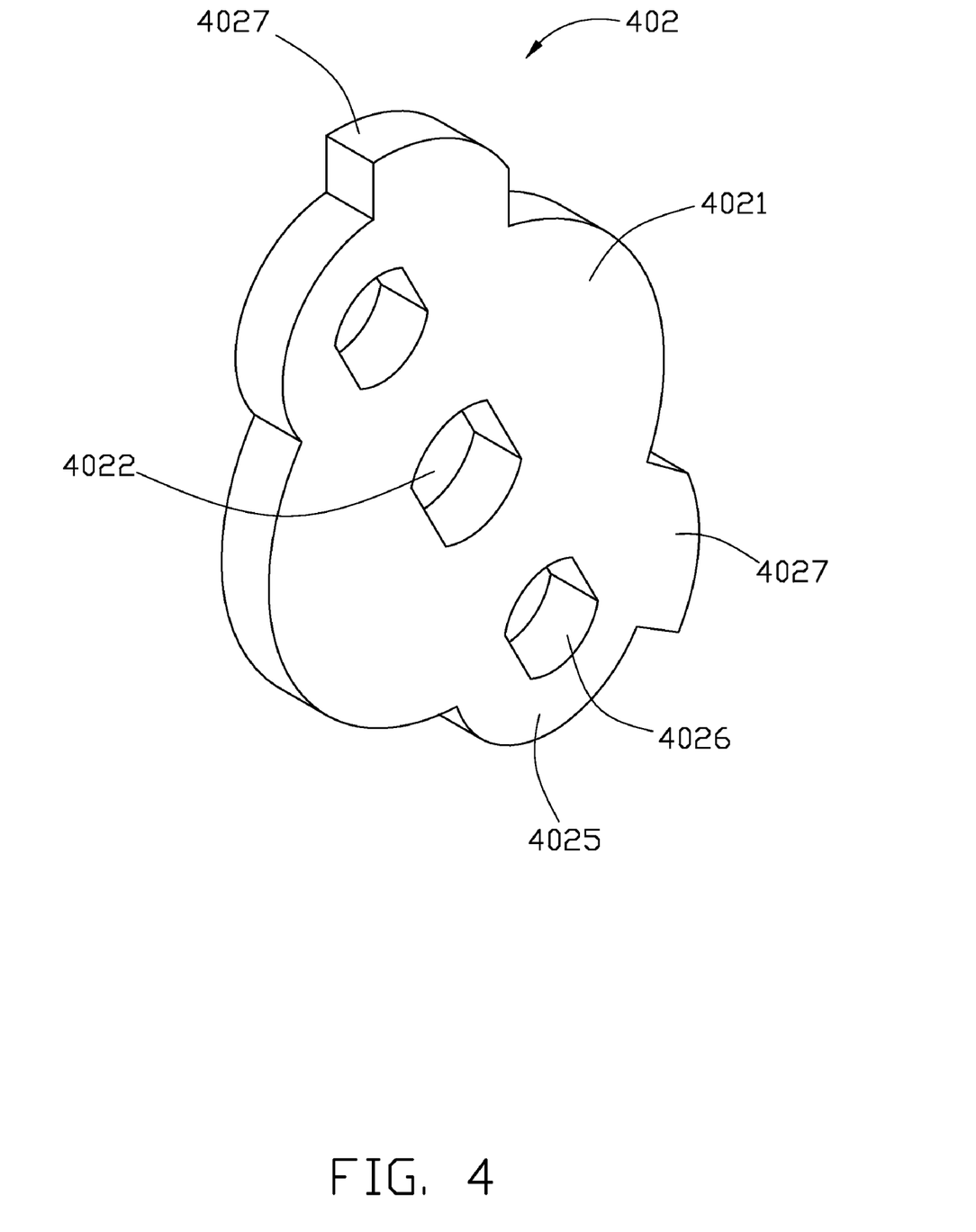
FIG. 4 is an isometric view of a restricting member in FIG. 2.

Referring to FIG. 4, the restricting member 402 includes a circular main body 4021 and two connecting portions 4025 extending from opposite sides of the main body 4021. The main body 4021 defines a pivot hole 4022 in a center portion corresponding to the first pivotal shaft 401. Each connecting portion 4025 defines a connecting hole 4026. A restricting protrusion 4027 is formed on an edge of each connecting portion 4025.

The connecting piece 403 defines a pivot hole 4031 in a center portion corresponding to the first pivotal shaft 401. The connecting piece 403 further defines two connecting holes 4032 adjacent to the pivot hole 4031 to engage with the connecting assembly 36.

The limiting washer 405 defines a deformed through hole 4051 in a middle portion so that the limiting washer 405 is non-rotatably sleeved on the first pivotal shaft 401. A limiting tab 4052 is formed on an edge portion of the limiting washer 405 to engage with the restricting groove 323 of the rotatable bracket 32, thus defining a rotatable range of the rotatable bracket 32.

The stationary washer 407 defines a circular through hole 4071 in a middle portion so that the stationary washer 407 is rotatably sleeved on the first pivotal shaft 401. The stationary washer 407 also defines two positioning grooves 4073 in a side surface, and forms a retaining tab 4072 on an edge portion to engage in the positioning hole 325 of the rotatable bracket 32.

The rotating washer 408 defines a deformed through hole 4081 in a middle portion so that the rotating washer 408 is non-rotatably sleeved on the first pivotal shaft 401. The rotating washer 408 forms two positioning protrusions (not shown) in a side surface to engage in the positioning grooves 4073 of the stationary washer 407.

The torsion spring 410 includes a plurality of spring rings 4101, and two connecting pegs 4102 extending from opposite sides of the spring rings 4101.

The resisting piece 411 defines a deformed through hole 4111 in a middle portion so that the resisting piece 411 is non-rotatably sleeved on the first pivotal shaft 401. The resisting piece 411 also defines a cutout 4112 in an edge portion to receive one of the connecting pegs 4102 of the torsion spring 410.

The second hinge assembly 50 has a similar structure as the first hinge assembly 40, but the second pivotal shaft 501 defines an engaging groove 5015 in a distal end corresponding to the engaging protrusion 4015 of the first pivotal shaft 401. In the illustrated embodiment, the engaging groove 5015 is a crossed-shape groove.

Each connecting assembly 36 connects the first connecting member 33 with the restricting member 402 and the connecting piece 403. Each connecting assembly 36 includes a fastener 361, four friction members 362, a washer 363, and a fastening component 364.

Each link assembly 37 rotatably connects the first connecting members 33 or the second connecting members 34 to the supporting blocks 312 of the base 31.

Figure 5:
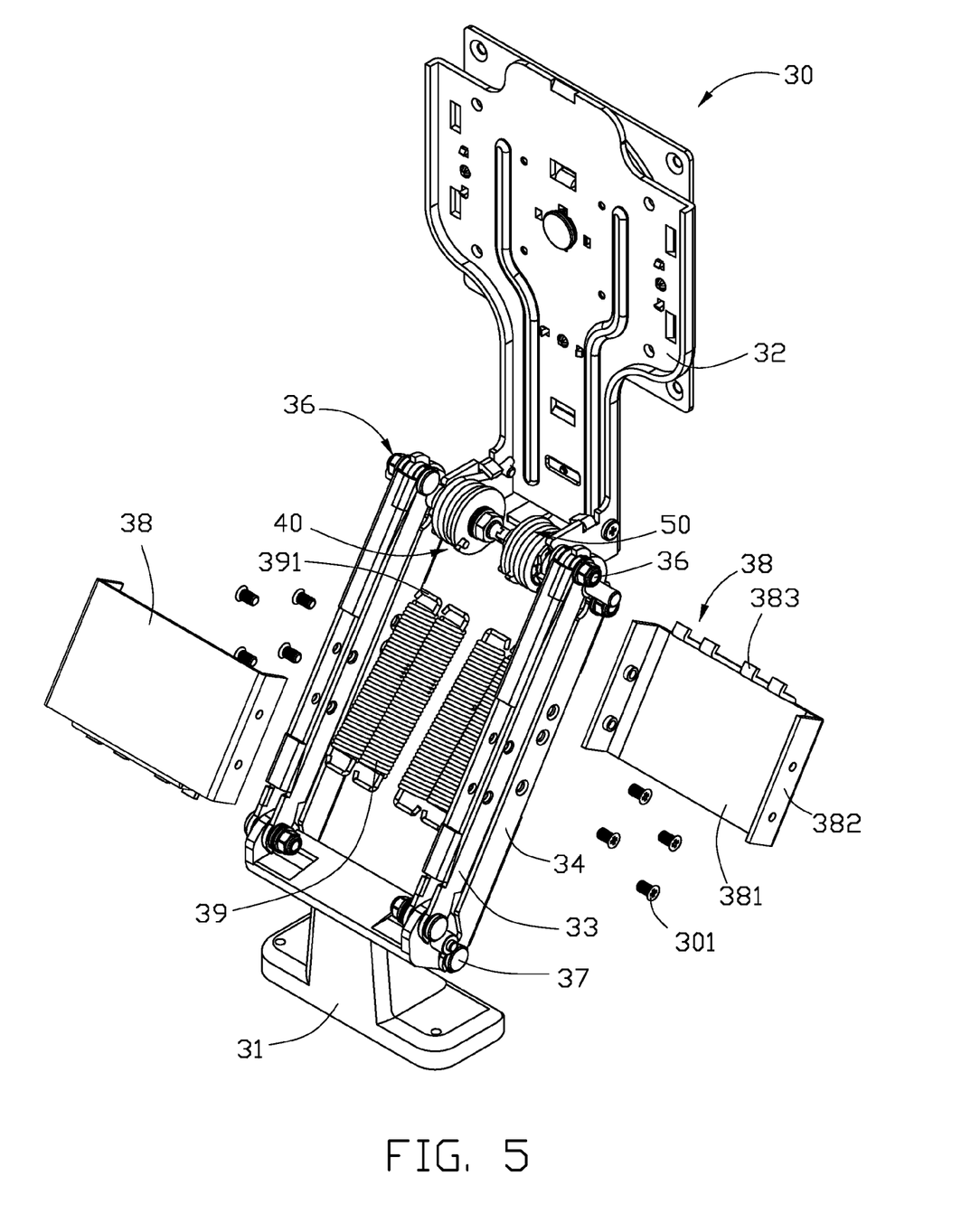
FIG. 5 is a partially exploded, isometric view of the support stand in FIG. 1.

Referring to FIG. 5, the connecting plate 38 includes a base plate 381 and two side plates 382 extending from opposite sides of the base plate 381. A plurality of positioning portions 383 are formed at an end of the base plate 381. In the illustrated embodiment, the base plate 381 is a rectangular plate. Four positioning portions 383 are formed at an end of the base plate 381.

Each elastic member 39 may be a compressed spring with two hooks 391 formed on opposite ends in this embodiment.

The support stand 30 is assembled by first assembling the first connecting members 33 to the supporting blocks 312 of the base 31 via the two link assemblies 37. The second connecting members 34 are also assembled to the supporting blocks 312 of the base 31 via the two link assemblies 37. The shaft portion 4013 of the first pivot shaft 401 passes through the restricting member 402, the connecting piece 403, the sleeve 404, the limiting washer 405, the frictional washer 406, the pivot hole 324 of one side wall 322 of the rotatable bracket 32, the stationary washer 407, the rotating washer 408, the ring 409, the torsion spring 410, a plurality of washers 412, and a plurality of spring washers 413 in that order. The fastening member 414 is engaged with the threaded portion 4014 of the second pivotal shaft 501. The limiting tab 4052 of the limiting washer 405 engages with the restricting groove 323 of the rotatable bracket 32. One connecting peg 4102 of the torsion spring 410 is positioned between the positioning pole 326 and the limiting tab 327 of the rotatable bracket 32, and the other connecting peg 4102 of the torsion spring 410 is latched in the cutout 4112 of the resisting piece 411. The second hinge assembly 50 is assembled to another supporting block 312 of the rotatable bracket 32 via the above describing steps. The engaging protrusion 4015 of the first pivotal shaft 401 is engaged in the engaging groove 5015 of the second pivotal shaft 501. One first connecting member 33 and one second connecting member 34 connect with one side wall 322 of the rotatable bracket 32 via the connecting assemblies 36, and the first connecting member 33 and the second connecting member 34 are positioned at opposite sides of the side wall 322. The other first connecting member 33 and the other second connecting member 34 connect to the other side wall 322 of the rotatable bracket 32 via the connecting assemblies 36. The side plates 382 of one connecting plate 38 are engaged in the positioning grooves 334 of the first connecting members 33. The hooks 391 of the elastic member 39 connect positioning portions 383 of the connecting plates 38. The side plates 382 of the other connecting plate 38 are engaged in the positioning grooves (not shown) of the second connecting members 34. The connecting plates 38 are fixed to the first connecting members 33 or the second connecting members 34 via fixing members 301.

Figure 6:
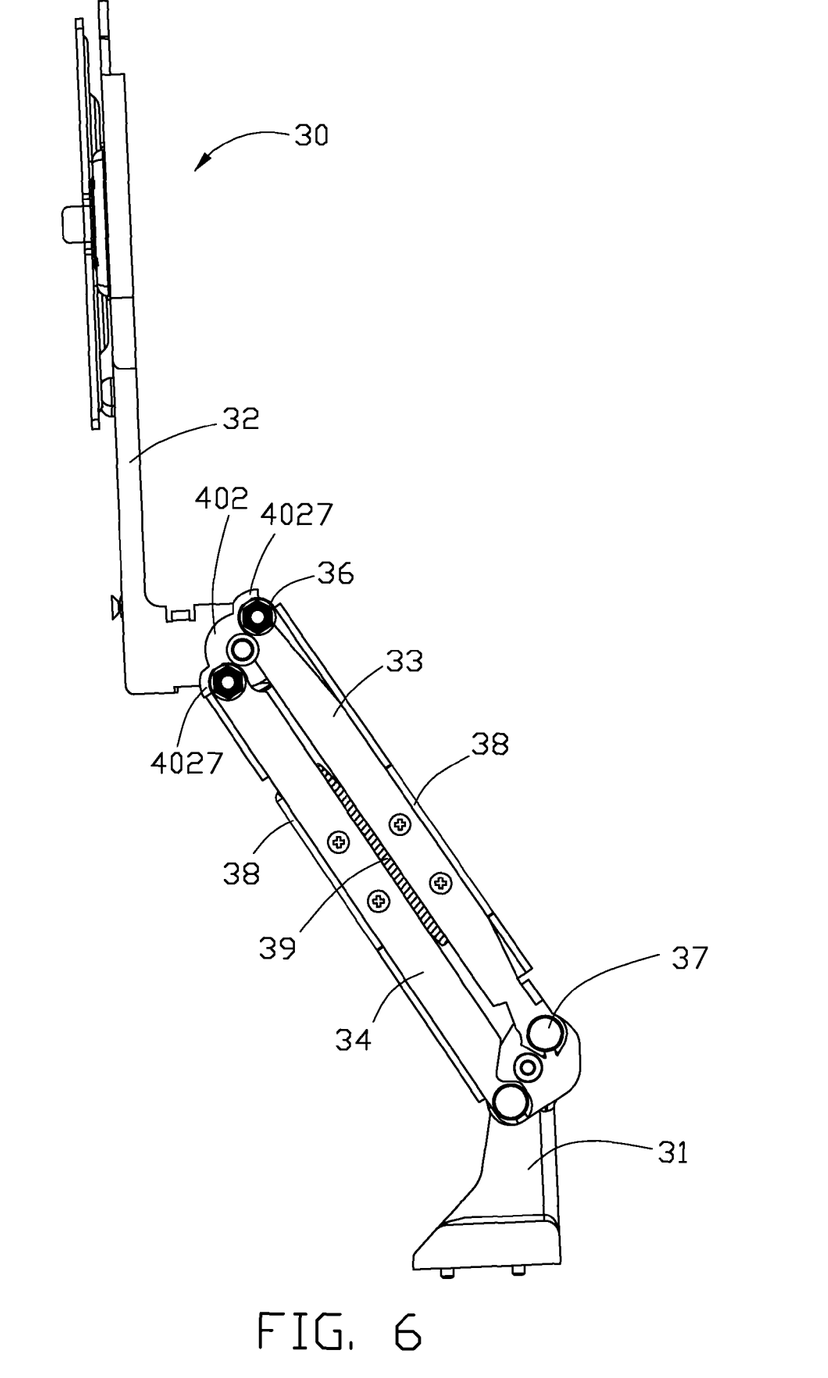
FIG. 6 is a side plane view of the support stand of FIG. 1.

Referring to FIG. 6, in use, the first connecting members 33 and the second connecting members 34 are capable of rotating on the link assemblies 37 relative to the base 31. The rotatable bracket 32 is capable of rotating on the first connecting members 33 and the second connecting members 34 relative to the first connecting members 33 and the second connecting members 34. A rotatable angle range of the rotatable bracket 32 is defined, because the limiting tab 4052 of the limiting washer 405 is slidable in the restricting groove 323 of the rotatable bracket 32. When the first connecting members 33 and the second connecting members 34 rotate through a predetermined angle relative to the base 31, the restricting protrusion 4027 of the restricting member 402 resists the first connecting members 33 or the second connecting members 34. Therefore, a rotatable angle range of the first connecting members 33 and the second connecting members 34 is defined.

The first pivotal shaft 40 can be firmly aligned in a substantially straight line because the first pivotal shaft 401 is non-rotatably engaged with the second pivotal shaft 501, thus preventing the flat-panel display monitor fixed on the rotatable bracket 32 from tilting. In addition, when the first connecting members 33 and the second connecting members 34 rotate relative to the base 31, an elastic force is produced by the elastic members 39, so a height of the flat-panel display monitor can be stably adjusted easily by an external force.

It should be pointed that the engaging protrusion 4015 may be other shapes, such as a column. The second pivotal shaft 501 should define a columnar engaging groove 5015. Moreover, the rotatable stand 32 may be directly connected to the base 31 via the first hinge assembly 40 and second hinge assembly 50. In that case, the flat-panel display monitor fixed on the rotatable bracket 32 can only rotate relative to the base 31. The support stand 30 may also include just one first connecting member 33 and second connecting member 34 or more than two first connecting members 33 and second connecting members 34.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A support stand, comprising:
a base;
a rotatable bracket;
two parallel first connecting members;
two parallel second connecting members;
a first hinge assembly; and
a second hinge assembly;
wherein both the first and second hinge assemblies together with the two first connecting members and the two second connecting members connect the rotatable bracket with the base; the first hinge assembly has a first pivotal shaft and a restricting member sleeved on the first pivotal shaft; the second hinge assembly has a second pivotal shaft and a restricting member sleeved on the second pivotal shaft; the first pivotal shaft is non-rotatably engaged with the second pivotal shaft, and aligned in a substantially straight line;
wherein two restricting protrusions are coplanarly formed on opposite sides of each restricting member; one restricting protrusion resists the first connecting member, the other restricting protrusion resists the second connecting member, thus defining a rotating angle range of the rotatable bracket.

2. The support stand of claim 1, wherein an engaging protrusion is formed on an end of the first pivotal shaft; the second pivotal shaft defines an engaging groove; the engaging protrusion is engaged in the engaging groove.

3. The support stand of claim 2, wherein the engaging protrusion is cross-shaped; the engaging groove is a cross-shaped groove corresponding to the shape of the engaging protrusion.

4. The support stand of claim 1, wherein the rotatable bracket comprises a mounting board and two side walls extending from opposite sides of the mounting board; the first pivotal shaft is positioned on one side wall and the second pivotal shaft is positioned on the other side wall.

5. The support stand of claim 1, an end of each first connecting member is rotatably connected to the rotatable bracket, the other end of each first connecting member is rotatably connected to the base.

6. The support stand of claim 5, an end of each second connecting member is rotatably connected to the rotatable bracket, the other end of each second connecting member is rotatably connected to the base.

7. The support stand of claim 1, wherein each of the first hinge assembly and the second hinge assembly comprises a limiting washer; a limiting tab is formed on an edge portion of the limiting washer; the rotatable bracket defines a restricting groove; the limiting tab engages with the restricting groove of the rotatable bracket, thus defining a rotating angle range of the rotatable bracket.

8. The support stand of claim 1, wherein each of the first hinge assembly and the second hinge assembly further comprises a stationary washer rotatably sleeved on the pivotal shaft, and a rotating washer non-rotatably sleeved on the pivotal shaft; the stationary washer defines a positioning groove in a side surface; the rotating washer forms a positioning protrusion in a side surface to engage in the positioning groove of the stationary washer.

9. The support stand of claim 1, wherein each of the first hinge assembly and the second hinge assembly further comprises a torsion spring and a resisting piece; the torsion spring has two connecting pegs; the resisting piece defines a cutout; one connecting peg of the torsion spring is connected to the rotatable bracket, the other connecting peg of the torsion spring is latched in the cutout of the resisting piece.

10. The support stand of claim 1, wherein each of the first hinge assembly and the second hinge assembly further comprises a frictional washer, a plurality of spring washers, and a fastening member sleeved on the pivot shaft to provide a frictional force for the rotatable bracket.

11. A support stand, comprising:
a base;
a rotatable bracket;
at least one first connecting member connecting the rotatable bracket with the base;
at least one second connecting member connecting the rotatable bracket with the base; and
a hinge assembly positioned on the rotatable bracket;
wherein the hinge assembly comprises a pivotal shaft and a restricting member sleeved on the pivotal shaft; two restricting protrusions are coplanarly formed on opposite sides of the restricting member; one restricting protrusion resists the first connecting member, the other restricting protrusion resists the second connecting member, thus defining a rotating angle range of the rotatable bracket.

12. The support stand of claim 11, wherein the at least one first connecting member comprises two first connecting members connecting the rotatable bracket with the base; the at least one second connecting member comprises two second connecting members connecting the rotatable bracket with the base.

13. The support stand of claim 11, wherein the hinge assembly comprises a limiting washer; a limiting tab is formed on an edge portion of the limiting washer; the rotatable bracket defines a restricting groove; the limiting tab engage with the restricting groove of the rotatable bracket, thus defining a rotating angle range of the rotatable bracket.

14. The support stand of claim 11, wherein the hinge assembly further comprises a stationary washer rotatably sleeved on the pivotal shaft, and a rotating washer non-rotatably sleeved on the pivotal shaft; the stationary washer defines a positioning groove in a side surface; the rotating washer forms a positioning protrusion in a side surface to engage in the positioning groove of the stationary washer.

15. The support stand of claim 11, wherein the hinge assembly further comprises a torsion spring and a resisting piece; the torsion spring has two connecting pegs; the resisting piece defines a cutout; one connecting peg of the torsion spring is connected to the rotatable bracket, the other connecting peg of the torsion spring is latched in the cutout of the resisting piece.

16. The support stand of claim 11, wherein the hinge assembly further comprises a frictional washer, a plurality of spring washers, and a fastening member sleeved on the pivot shaft to provide frictional force for the rotatable bracket.

17. A support stand, comprising:
a base;
a rotatable bracket;
two first connecting members connecting the rotatable bracket with the base;
two second connecting members connecting the rotatable bracket with the base;

two connecting plates; and at least one elastic member;

two hinge assemblies coaxially positioned on the rotatable bracket;

wherein one connecting plate connects the two first connecting members, the other connecting plate connects the two second connecting members; the at least one elastic member connects the two connecting plates, thus producing an elastic force to support the rotatable bracket and its load;

wherein each hinge assembly comprises a pivotal shaft and a restricting member sleeved on the pivotal shaft; two restricting protrusions are coplanarly formed on opposite sides of the restricting member and respectively resists the first connecting member and the second connecting member, thus defining a rotating angle range of the rotatable bracket.

18. The support stand of claim 17, wherein each of the connecting plate comprises a base plate and two side plates extending from opposite sides of the base plate, the side plates engage with the first connecting members or the second connecting members.

19. The support stand of claim 18, wherein the at least one elastic member comprises two hooks formed on opposite ends; at least one positioning portion is formed on the base plate of each connecting plate; one hook of the at least one elastic member engages with the positioning portion of one connecting plate, the other hook of the at least one elastic member engages with the positioning portion of the other connecting plate.

* * * * *